(12) United States Patent
Yadav et al.

(10) Patent No.: US 12,316,534 B2
(45) Date of Patent: May 27, 2025

(54) LATENCY SENSITIVE NETWORK PLANE VIA SR FLEX ALGORITHM FOR LAYER 1 SERVICES

(71) Applicant: Ciena Corporation, Hanover, MD (US)

(72) Inventors: Bhupendra Yadav, Ottawa (CA); Prabhu Vaithilingam, Kanata (CA); Gerald Smallegange, Stittsville (CA); Alwyn Joy George, New Delhi (IN)

(73) Assignee: Ciena Corporation, Hanover, MD (US)

( * ) Notice: Subject to any disclaimer, the term of this patent is extended or adjusted under 35 U.S.C. 154(b) by 241 days.

(21) Appl. No.: 18/101,677

(22) Filed: Jan. 26, 2023

(65) Prior Publication Data

US 2024/0205142 A1    Jun. 20, 2024

(30) Foreign Application Priority Data

Dec. 14, 2022   (IN) .............................. 202211072158

(51) Int. Cl.
    *H04L 45/00* (2022.01)
    *H04L 45/121* (2022.01)

(52) U.S. Cl.
    CPC ............ *H04L 45/34* (2013.01); *H04L 45/121* (2013.01)

(58) Field of Classification Search
    None
    See application file for complete search history.

(56) References Cited

U.S. PATENT DOCUMENTS

| | | | |
|---|---|---|---|
| 7,609,620 B2 | 10/2009 | Raj et al. | |
| 7,969,898 B1 | 6/2011 | Raj et al. | |
| 8,116,308 B2 | 2/2012 | Ellis et al. | |
| 8,504,727 B2 | 8/2013 | Mohan et al. | |
| 8,576,708 B2 | 11/2013 | Gandhi et al. | |
| 9,049,142 B1 | 6/2015 | Osborne et al. | |
| 9,197,493 B2 | 11/2015 | Holness et al. | |
| 10,158,448 B2 | 12/2018 | Prakash et al. | |
| 10,469,367 B2 | 11/2019 | Filsfils et al. | |
| 2007/0268817 A1 | 11/2007 | Smallegange et al. | |
| 2008/0273472 A1 | 11/2008 | Bashford et al. | |
| 2009/0190610 A1* | 7/2009 | Pirbhai | H04L 12/2852 370/466 |
| 2015/0365294 A1 | 12/2015 | Khan et al. | |
| 2021/0266251 A1 | 8/2021 | Yadav et al. | |
| 2022/0247663 A1* | 8/2022 | Van de Velde | H04L 45/302 |
| 2022/0303212 A1* | 9/2022 | Chan | H04L 45/04 |

FOREIGN PATENT DOCUMENTS

EP    3 813 310 A1    4/2021

\* cited by examiner

*Primary Examiner* — Anh Ngoc M Nguyen
(74) *Attorney, Agent, or Firm* — Baratta Law PLLC; Lawrence A. Baratta, Jr.

(57) ABSTRACT

Systems and methods include maintaining a network plane in Segment Routing (SR) Flexible Algorithm having a Flexible Algorithm Definition (FAD) based on latency; receiving a request for a service over a SR network where the service is sensitive to a specific latency; and determining a label stack including one or more Segment Identifiers (SID) for the service, with the one or more SIDs based on the network plane in SR Flexible Algorithm. This can be used for Private Line Emulation (PLE) services and Circuit Emulation (CEM) services over SR, ensuring latency while not requiring large label stacks.

15 Claims, 6 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |Flex-Algorithm |
+-+-+-+-+-+-+-+-+-+-+-+-+-+-+-+-+-+-+-+-+-+-+-+-+-+-+-+-+-+-+-+-+
|                     Minimum Latency Value                     |
+-+-+-+-+-+-+-+-+-+-+-+-+-+-+-+-+-+-+-+-+-+-+-+-+-+-+-+-+-+-+-+-+
|                     Maximum Latency Value                     |
+-+-+-+-+-+-+-+-+-+-+-+-+-+-+-+-+-+-+-+-+-+-+-+-+-+-+-+-+-+-+-+-+
```

*FIG. 7*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|Flex-Algorithm |    Flags      |           Reserved            |
+-+-+-+-+-+-+-+-+-+-+-+-+-+-+-+-+-+-+-+-+-+-+-+-+-+-+-+-+-+-+-+-+
|                     Minimum Latency Value                     |
+-+-+-+-+-+-+-+-+-+-+-+-+-+-+-+-+-+-+-+-+-+-+-+-+-+-+-+-+-+-+-+-+
|                     Maximum Latency Value                     |
+-+-+-+-+-+-+-+-+-+-+-+-+-+-+-+-+-+-+-+-+-+-+-+-+-+-+-+-+-+-+-+-+
```

*FIG. 8*

LATENCY SENSITIVE NETWORK PLANE
VIA SR FLEX ALGORITHM FOR LAYER 1
SERVICES

FIELD OF THE DISCLOSURE

The present disclosure relates generally to networking and computing. More particularly, the present disclosure relates to systems and methods for a latency sensitive network plane via Segment Routing (SR) Flex Algorithm for layer 1 services.

BACKGROUND OF THE DISCLOSURE

Network operators are looking for replacement for Synchronous Optical Network (SONET), Synchronous Digital Hierarchy (SDH), Optical Transport Network (OTN), and the like to provide Private Line Emulation (PLE) services and Circuit Emulation (CEM) services over packet networks. Services can pass through the packet network. That is, networks are evolving at layer 1 (Time Division Multiplexing (TDM)) and there is no longer a need for SONET, SDH, or OTN. Instead, networks are being designed with Multiprotocol Label Switching (MPLS), Segment Routing (SR), etc. over an optical layer (layer 0, e.g., Dense Wavelength Division Multiplexing (DWDM)). For any layer 1 services, PLE or CEM can be provided over the packet network. To keep discussion simple PLE is used to represent both PLE and CEM herein. That is, PLE is used herein to refer to any layer 1 service being emulated over a packet network.

PLE services require low latency paths. On a SR network, to compute low latency paths, the topology needs to be flooded with latency information using interior gateway protocol (IGP) or the like. There are drafts available to compute latency in SR network and flood it into the topology using IGP. Latency information collected at packet level is not accurate. With a converged network, latency information can be retrieved from lower layers, which is more accurate, and provided to layer 3 for flooding into the network. Once this information is available in the topology, it can be used to calculate SR paths. Disadvantageously, requiring a specific path in SR can lead to large segment identifier (SID) label stack.

Known solutions rely on colored links which increase stack depth to unusable sizes unless the default path is the lowest latency. Multiple SR policies are stitched together to get around the stack size issue. These solutions are also configuration intensive as they require every link to be colored. Moreover, these solutions are not dynamic in nature to react to changes in latency of network.

BRIEF SUMMARY OF THE DISCLOSURE

The present disclosure relates to systems and methods for a latency sensitive network plane via segment routing (SR) Flex Algorithm for layer 1 services. The present disclosure includes a Flex Algorithm Definition (FAD) for latency information, shared by a new sub-Type-Length-Value (TLV). This FAD is used to dynamically build a flex algo plane to provide a traffic engineered view of the network. This traffic engineered view restricts SID stack scope thereby avoiding large stacks. With every network event, the flexible algorithm plane is automatically adjusted based on latency information. This FAD and associated plane can be advantageously used for PLE services over SR.

In an embodiment, the present disclosure includes a method having steps, a network element configured to implement the steps, a network where the steps are implemented, a processing device configured to implement the steps, and a non-transitory computer-readable medium with instructions that, when executed, cause one or more processors to implement the steps. The steps include maintaining a network plane in Segment Routing (SR) Flexible Algorithm having a Flexible Algorithm Definition (FAD) based on latency; receiving a request for a service over a SR network where the service is sensitive to a specific latency; and determining a label stack including one or more Segment Identifiers (SID) for the service, with the one or more SIDs based on the network plane in SR Flexible Algorithm.

The steps can include receiving Link State Advertisements (LSA) with a Type-Length-Value (TLV) and a sub-TLV for the FAD. The TLV can specify the FAD and the sub-TLV can include one or more values for latency on a given link in the SR network. The FAD can include one or more of a latency range, a latency value, and a latency tolerance, for each of a plurality of links in the SR network. Values for latency can be based on measurements at lower layers over which the SR network operates. The FAD can be maintained over time based on network events and flooding of adjusted latency information. The service can be one of a Private Line Emulation (PLE) service and a Circuit Emulation (CEM) service.

BRIEF DESCRIPTION OF THE DRAWINGS

The present disclosure is illustrated and described herein with reference to the various drawings, in which like reference numbers are used to denote like system components/method steps, as appropriate, and in which:

FIG. 7 is a diagram of an example of a sub-TLV for use with the TLV in ISIS in FIG. 6.

FIG. 8 is a diagram of an example of a sub-TLV for use with the FAD TLV in OSPF in FIG. 5.

DETAILED DESCRIPTION OF THE
DISCLOSURE

Again, the present disclosure relates to systems and methods for a latency sensitive network plane via segment routing (SR) Flex Algorithm for layer 1 services. The present disclosure includes a Flex Algorithm Definition (FAD) for latency information, shared by a new sub-Type-Length-Value (TLV). This FAD is used to dynamically build a flex algo plane to provide a traffic engineered view of the network. This traffic engineered view restricts SID stack scope thereby avoiding large stacks. With every network event, the flexible algorithm plane is automatically adjusted based on latency information. This FAD and associated plane can be advantageous used for PLE services over SR. By including the latency metrics in the FAD plane, there is no need for hop-by-hop steering in SR to obtain the desired latency. Rather, a new service merely needs to specify the latency requirements and the nodes in the FAD plane automatically enforce the requirements.

Example Network

Figure 1:
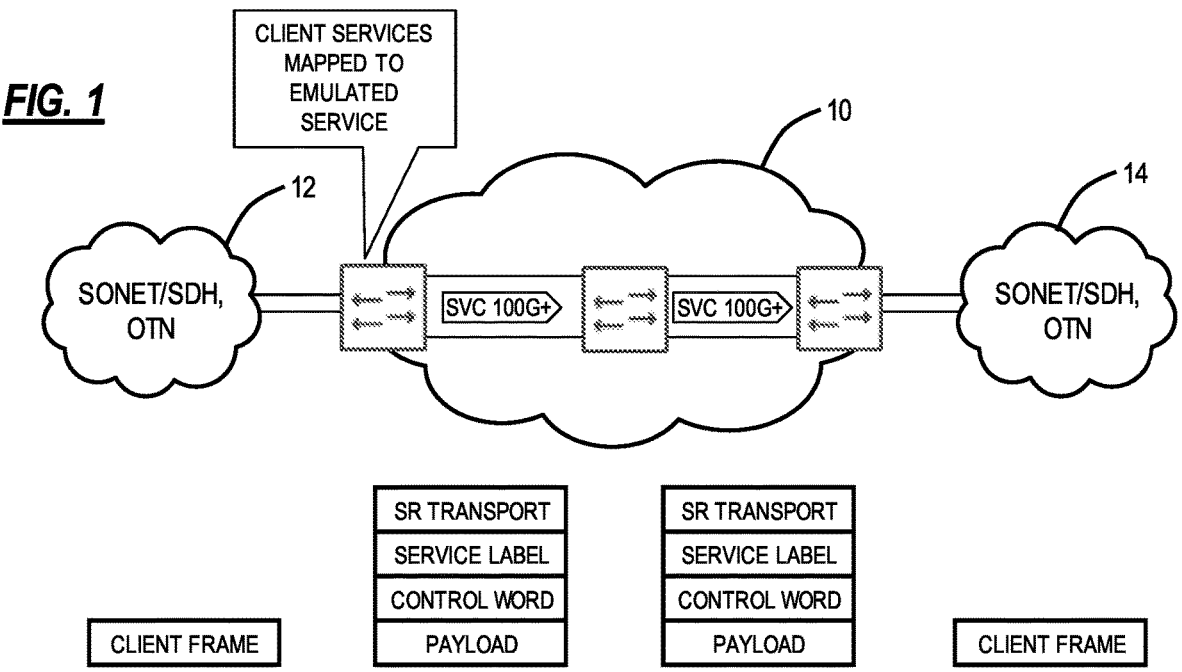
FIG. 1 is a network diagram of a SR network interconnecting two SONET/SDH or OTN networks.
Figure 2:
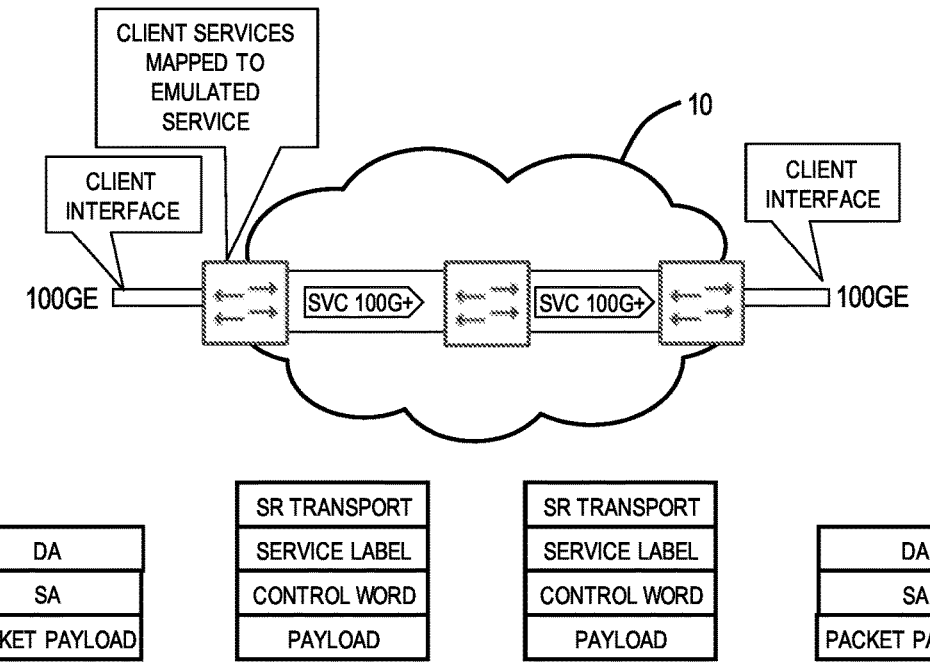
FIG. 2 is a network diagram of the SR network providing client services, e.g., a 100 Gigabit Ethernet (GE).

FIG. 1 is a network diagram of a SR network 10 interconnecting two SONET/SDH or OTN networks 12, 14. FIG. 2 is a network diagram of the SR network 10 providing client services, e.g., a 100 Gigabit Ethernet (GE). In both examples, the client services are mapped to an emulated service and then transported over the SR network 10. Again, these services require low latency paths. Again, to compute low latency paths, there is a need to flood latency information. Latency information collected at packet level is not accurate. With a converged network latency, information can be retrieved from lower layers, which is more accurate, and provided to layer 3 for flooding into the network. Once this information is available in the topology, it can be used to calculate SR paths.

Figure 3:
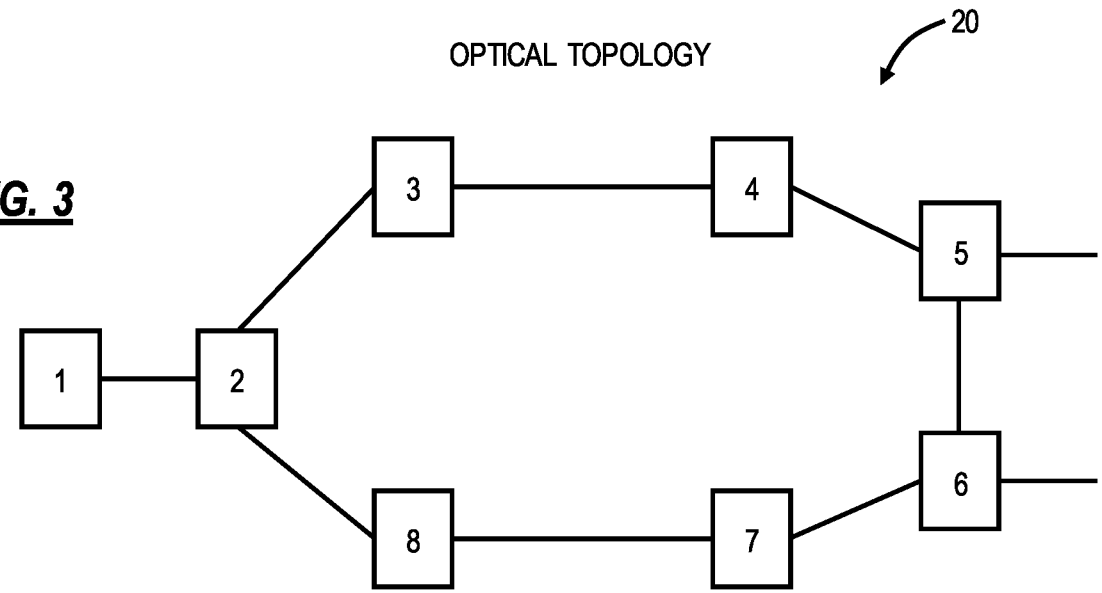
FIG. 3 is a network diagram of a network of nodes 1-8, illustrating an optical topology.
Figure 4:
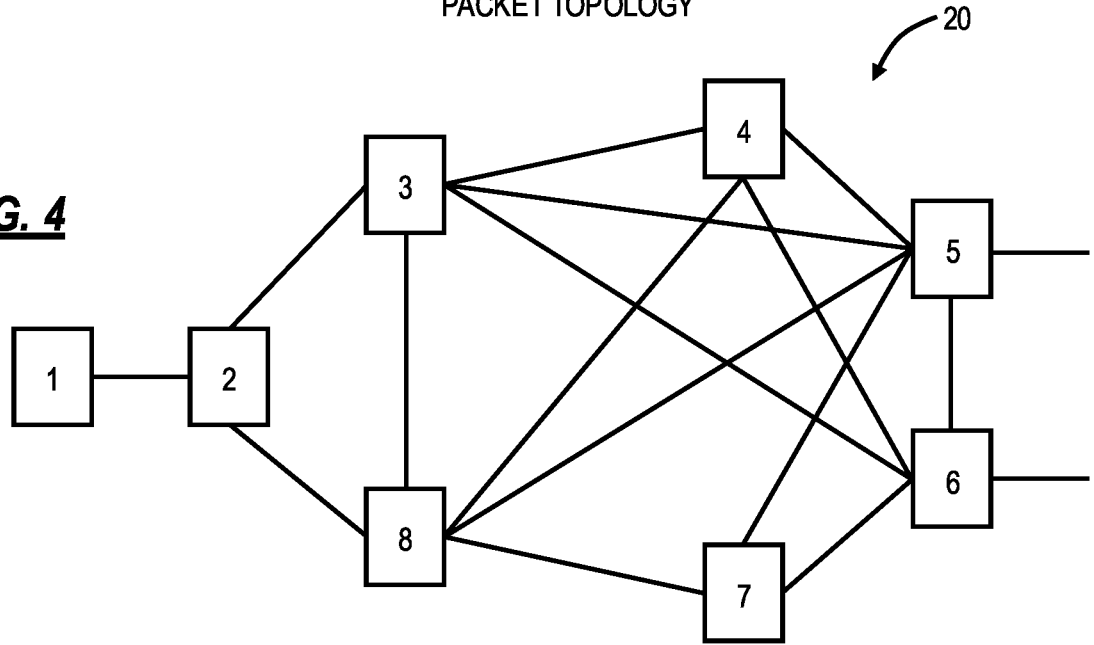
FIG. 4 is a network diagram of the network, illustrating a packet topology.

FIG. 3 is a network diagram of a network 20 of nodes 1-8, illustrating an optical topology. FIG. 4 is a network diagram of the network 20, illustrating a packet topology. When computing a path with latency as metric, every link's latency attribute will be looked at. Consider the optical topology in FIG. 3, and the packet topology in FIG. 4, both for the same network 20. In these topologies, a packet link between node 3 and 8 seems direct but, it is via node 2 and second path will traverse nodes 4, 5, 6 and 7 to reach 8 from 3. The default path can be any one of them. To force traffic on to the lowest latency path will require the use of an adjacency SID.

Assuming traffic is flowing from node 2 to node 8, traffic may take either north or south path whichever provides lowest latency. Adjacency SIDs will be used to force the packet down a link which is not the default link for the next hop. Computing such a path with latency metric will result in a very large label stack.

Existing solutions use a combination of link affinity and using multiple policies to get around stack size issue. None of the solutions are good as they are configuration intensive and fragile, and they can easily break with network events which can cause change in routing.

Segment Routing Overview

Segment Routing (SR) is a technology that implements a source routing paradigm. A packet header includes a stack of function identifiers, known as segments, which define an ordered list of functions to be applied to the packet. A segment can represent any instruction, topological, or service-based. A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. Segment Routing is described, e.g., in Fiflsfils et al., RFC 8402, "Segment Routing Architecture," Internet Engineering Task Force (IETF), July 2018, the contents of which are incorporated herein by reference. A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by a Software-Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header— for example, the document published in July 2015 as draft-previdi-6man-segment-routing-header (available online at tools.ietforg/html/draft-previdi-6man-segment-routing-header-08) and RFC 8754, "IPv6 Segment Routing Header (SRH)," March 2020, the contents of both are incorporated by reference. A segment is encoded as an IPv6 address. An ordered list of segments is encoded as an ordered list of IPv6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each Segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by ISIS or OSPF. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Element (PCE) (e.g., when paths span across multiple IGP areas/levels).

SR Flex Algorithm

SR Flex Algorithm is described, e.g., in draft-ppsenak-ospf-sr-flex-algo-00.txt, "OSPF Segment Routing Flexible Algorithm," Feb. 16, 2018, the contents of which are incorporated by reference in their entirety. SR Flex Algorithm can be referred to as SR Flexible Algorithm, SR Flex Algo, etc. The objective of SR Flex Algorithm is to create a new plane in the network.

The present disclosure contemplates use of SR Flex Algorithm with a FAD based on latency, to solve the path computation problem with a latency metric. Specifically, the present disclosure provides a latency range as a metric. This information is shared across the network via the Flex Algorithm standard, via a FAD TLV. For a given service requiring a specific latency, the latency range is used to ensure that a given label stack meets the specific latency. This removes the need for a large label stack to steer traffic. Rather, simply specifying the required latency and the use of the FAD for latency, any given label stack will support the required latency.

Advertisements

Figure 5:
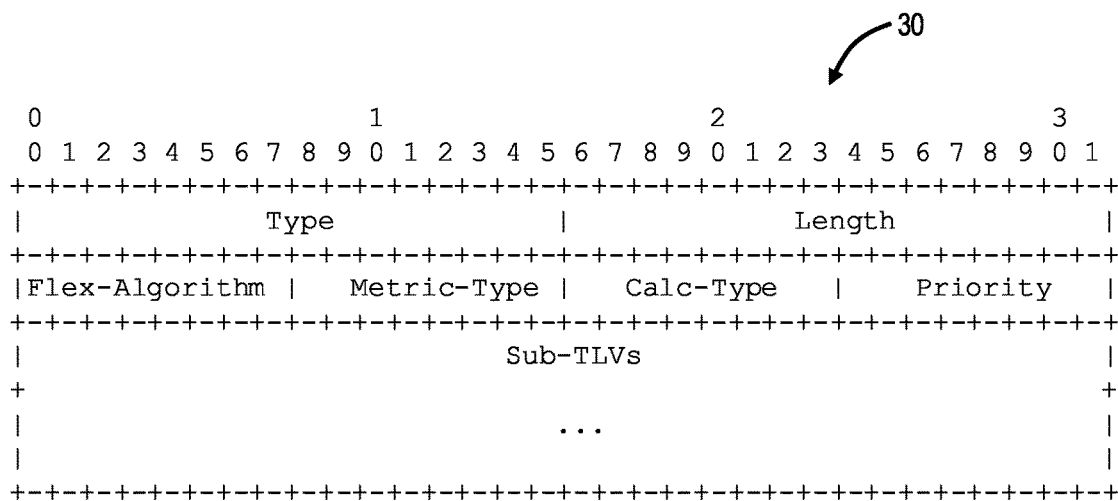
FIG. 5 is a diagram of a standard FAD TLV for OSPF, with type 16.
Figure 6:
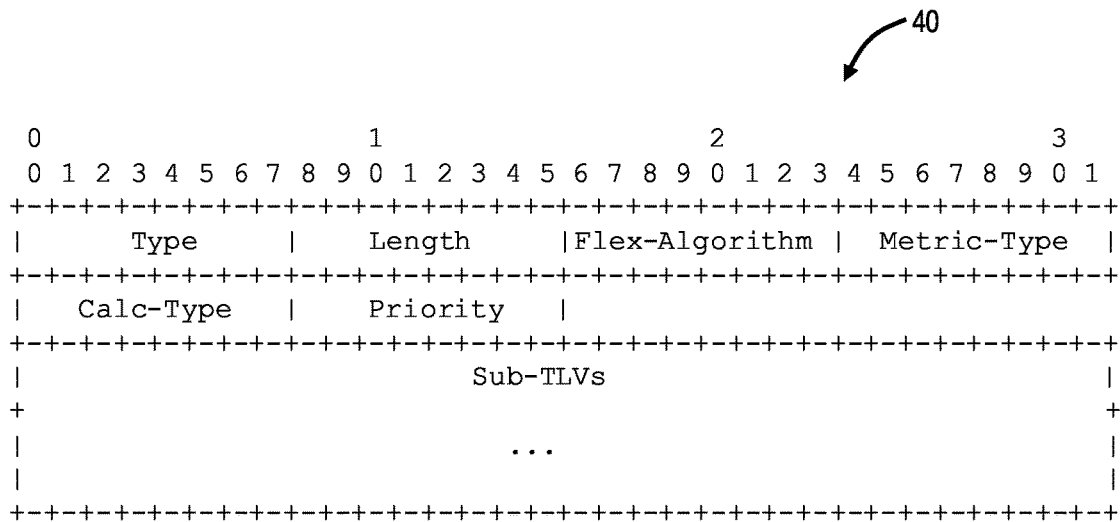
FIG. 6 is a diagram of a TLV in ISIS, with type 26.

FIG. 5 is a diagram of a standard FAD TLV 30 for OSPF, with type 16. The FAD TLV 30 is used to advertise the definition of the Flex Algorithm. The FAD TLV 30 is advertised as a top-level TLV of the Router Information (RI) Link State Advertisement (LSA) that is defined in RFC 7770, "Extensions to OSPF for Advertising Optional Router Capabilities," February 2016, the contents of which are incorporated by reference in their entirety. When the definition of the Flex Algorithm is advertised, it is applicable to all topologies supported on the receiving node. FIG. 6 is a diagram of a TLV 40 in ISIS, with type 26. Of note, this is similar to the FAD TLV 30.

For IGP to be able to flood this information, a new metric type is defined herein. For example, this can be a type 3 metric that can be added to "IGP Metric-Type" registry named as 'latency range.' Additionally, a sub-TLV can be introduced which will carry the acceptable latency range. The metric type can be populated in the existing FAD TLV 30 and the sub-TLV can contain the acceptable latency range.

FIG. 7 is a diagram of an example of a sub-TLV 50 for use with the TLV 40 in ISIS. FIG. 8 is a diagram of an example of a sub-TLV 60 for use with the FAD TLV 30 in OSPF. Note, the type value, in bother the sub-TLVs 50, 60, can be anything and can be determined via a standardization process.

In the above sub-TLVs 50, 60, latency is shown as minimum and maximum, but it can be any other way to express a range, including but not limited to a value and tolerance. Additional details can be added to this sub-TLV during the standardization process and as seen important by the implementations. Once this information is shared across the network, all participating nodes will allocate their own prefix SID for this flex algorithm. Along with prefix SID all participating nodes will add their IGP links that meet the criteria to this flex algorithm. This will build a parallel topology which meets the latency criteria. Any path computed in this algorithm will not require individual link consideration as that has also been filtered by flex algorithm.

Policies can override and fine tune latency parameter using attribute sets during computation. A path computation can include multiple paths which can be programmed as Equal Cost Multi Path (ECMP) and Unequal Cost Multi Path (UCMP).

Latency

As described above, latency information can be at layer 3 by learning from lower layers and flooded into the network using IGP. All nodes require an IGP configuration to add participating interfaces to IGP. This configuration is not specific to this solution. A pre-determined FAD (Flex Algorithm Definition) is configured on a router and is flooded into IGP domain, e.g., 250. As part of the FAD, a latency range or the like will be configured which is also flooded as part of FAD in the new sub-TLV. All participating nodes will now use this advertised latency range to add their links to this flex algo plane and advertise a plane specific prefix SID.

Example Node

Figure 9:
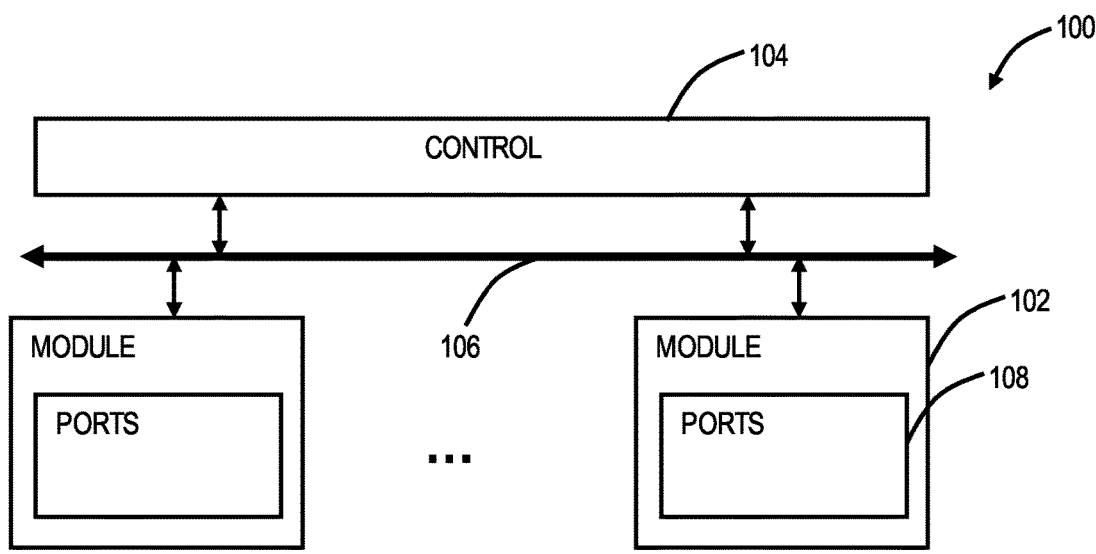
FIG. 9 is a block diagram of an example implementation of a node, such as for any of the nodes 1-8 in the network of FIG. 3.

FIG. 9 is a block diagram of an example implementation of a node 100, such as for any of the nodes 1-8 in the network 20. Those of ordinary skill in the art will recognize FIG. 9 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, a Path Computation Element (PCE), etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 9 is meant to provide a functional view, and those of ordinary skill in the art will recognize actual hardware implementations may vary.

Example Controller

Figure 10:
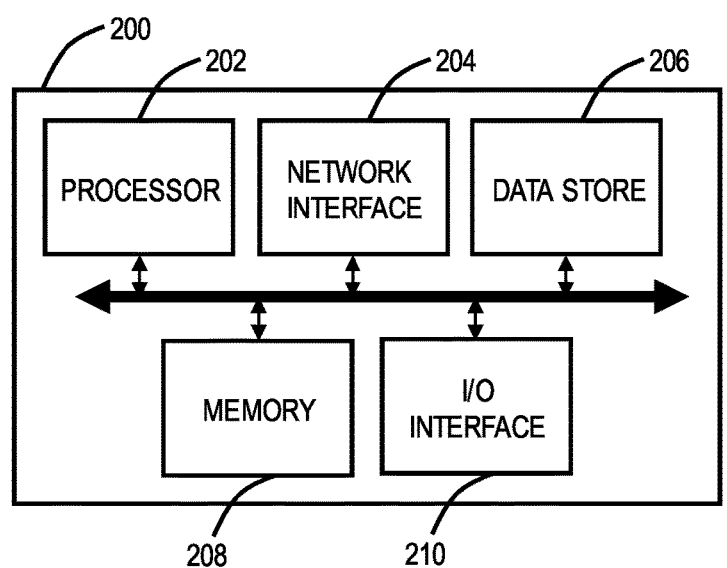
FIG. 10 is a block diagram of an example processing device.

FIG. 10 is a block diagram of an example processing device 200, which can form a control module for a network element, a management system, a PCE, etc. The processing device 200 can be part of the network element, or a stand-alone device communicatively coupled to the network element. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes 12, the PCE 20, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Process

Figure 11:
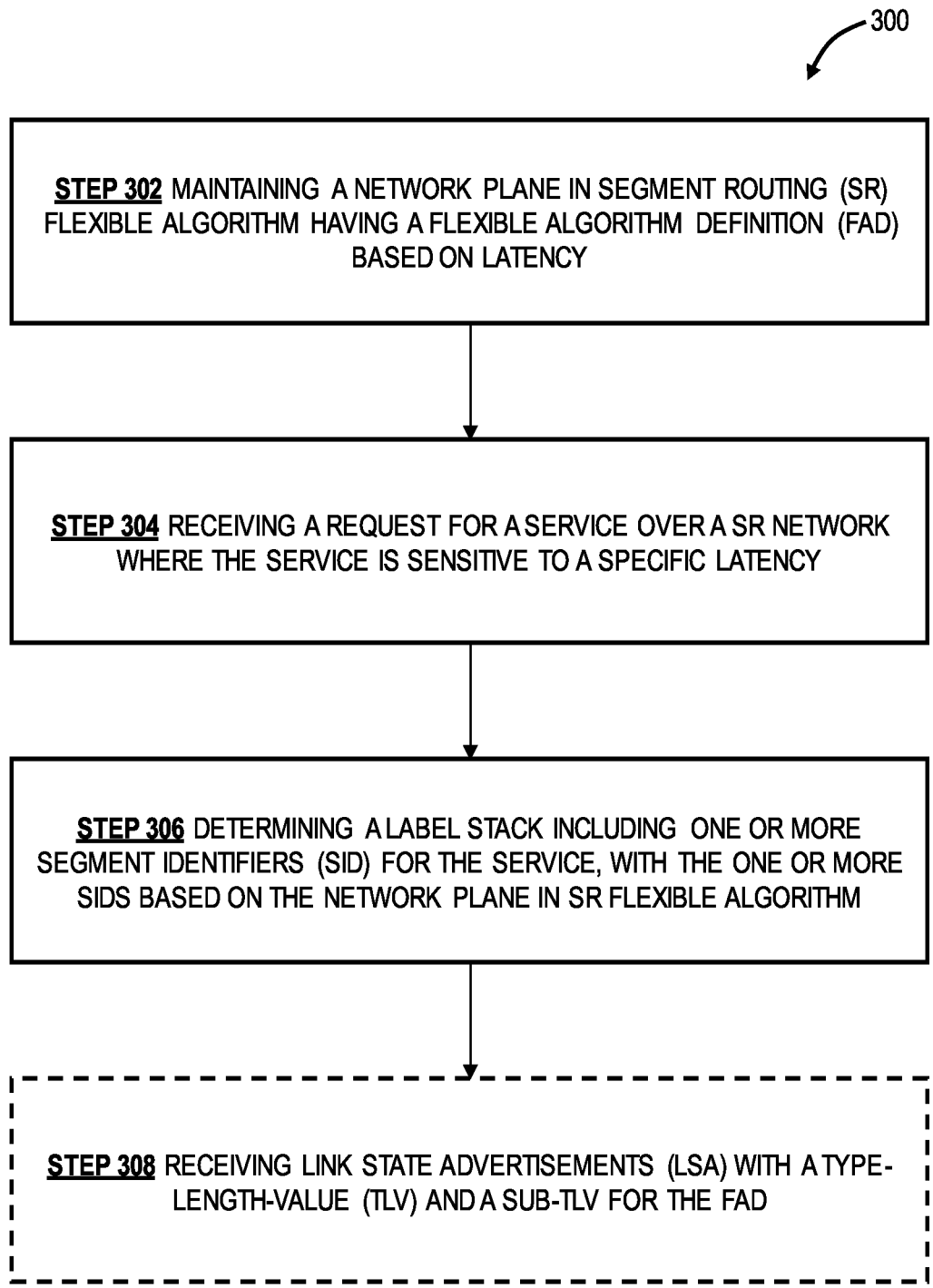
FIG. 11 is a flowchart of a process for a latency sensitive network plane via Segment Routing (SR) Flex Algorithm for layer 1 services.

FIG. 11 is a flowchart of a process 300 for a latency sensitive network plane via Segment Routing (SR) Flex Algorithm for layer 1 services. The process 300 contemplated implementation as a method having steps, via the processing device 200 and/or the node 100 implementing the steps, and as a non-transitory computer-readable medium storing instructions for the steps.

The process 300 includes maintaining a network plane in Segment Routing (SR) Flexible Algorithm having a Flexible Algorithm Definition (FAD) based on latency (step 302); receiving a request for a service over a SR network where the service is sensitive to a specific latency (step 304); and determining a label stack including one or more Segment Identifiers (SID) for the service, with the one or more SIDs based on the network plane in SR Flexible Algorithm (step 306). The process 300 can include receiving Link State Advertisements (LSA) with a Type-Length-Value (TLV) and a sub-TLV for the FAD (step 308). The TLV specifies the FAD and the sub-TLV includes one or more values for latency on a given link in the SR network.

The FAD can include one or more of a latency range, a latency value, and a latency tolerance, for each of a plurality of links in the SR network. Values for latency can be based on measurements at lower layers over which the SR network operates. The FAD can be maintained over time based on network events and flooding of adjusted latency information. The service can be one of a Private Line Emulation (PLE) service and a Circuit Emulation (CEM) service.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A processing device comprising:
at least one processor and memory storing instructions that, when executed, cause the at least one processor to
maintain a network plane in Segment Routing (SR) Flexible Algorithm having a Flexible Algorithm Definition (FAD) based on latency, wherein the FAD includes one or more of a latency range, a latency value, and a latency tolerance, for each of a plurality of links in the SR network, and wherein values for latency are based on measurements at lower layers over which the SR network operates,
receive a request for a service over a SR network where the service is sensitive to a specific latency, and
determine a label stack including one or more Segment Identifiers (SID) for the service, with the one or more SIDs based on the network plane in SR Flexible Algorithm.

2. The processing device of claim 1, wherein the instructions that, when executed, further cause the at least one processor to
receive Link State Advertisements (LSA) with a Type-Length-Value (TLV) and a sub-TLV for the FAD.

3. The processing device of claim 2, wherein the TLV specifies the FAD and the sub-TLV includes one or more values for latency on a given link in the SR network.

4. The processing device of claim 1, wherein the FAD is maintained over time based on network events and flooding of adjusted latency information.

5. The processing device of claim 1, wherein the service is one of a Private Line Emulation (PLE) service and a Circuit Emulation (CEM) service.

6. A non-transitory computer-readable medium comprising instructions that, when executed, cause at least one processor to perform steps of:
maintaining a network plane in Segment Routing (SR) Flexible Algorithm having a Flexible Algorithm Definition (FAD) based on latency, wherein the FAD includes one or more of a latency range, a latency value, and a latency tolerance, for each of a plurality of links in the SR network, and wherein values for latency are based on measurements at lower layers over which the SR network operates;
receiving a request for a service over a SR network where the service is sensitive to a specific latency; and
determining a label stack including one or more Segment Identifiers (SID) for the service, with the one or more SIDs based on the network plane in SR Flexible Algorithm.

7. The non-transitory computer-readable medium of claim 6, wherein the steps further include
receiving Link State Advertisements (LSA) with a Type-Length-Value (TLV) and a sub-TLV for the FAD.

8. The non-transitory computer-readable medium of claim 7, wherein the TLV specifies the FAD and the sub-TLV includes one or more values for latency on a given link in the SR network.

9. The non-transitory computer-readable medium of claim 6, wherein the FAD is maintained overtime based on network events and flooding of adjusted latency information.

10. The non-transitory computer-readable medium of claim 6, wherein the service is one of a Private Line Emulation (PLE) service and a Circuit Emulation (CEM) service.

11. A method comprising steps of:
maintaining a network plane in Segment Routing (SR) Flexible Algorithm having a Flexible Algorithm Definition (FAD) based on latency, wherein the FAD is maintained over time based on network events and flooding of adjusted latency information;
receiving a request for a service over a SR network where the service is sensitive to a specific latency; and
determining a label stack including one or more Segment Identifiers (SID) for the service, with the one or more SIDs based on the network plane in SR Flexible Algorithm.

12. The method of claim 11, wherein the steps further include
receiving Link State Advertisements (LSA) with a Type-Length-Value (TLV) and a sub-TLV for the FAD.

13. The method of claim 12, wherein the TLV specifies the FAD and the sub-TLV includes one or more values for latency on a given link in the SR network.

14. The method of claim 11, wherein the FAD includes one or more of a latency range, a latency value, and a latency tolerance, for each of a plurality of links in the SR network.

15. The method of claim 14, wherein values for latency are based on measurements at lower layers over which the SR network operates.

* * * * *